United States Patent
Tso et al.

(10) Patent No.: US 8,451,596 B2
(45) Date of Patent: May 28, 2013

(54) ELECTRONIC DEVICE WITH CLEANING MECHANISM CAPABLE OF CLEANING DISPLAY PANEL THEREOF

(75) Inventors: Chi-Hai Tso, New Taipei (TW); Hsin-Hao Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 46 days.

(21) Appl. No.: 13/305,265

(22) Filed: Nov. 28, 2011

(65) Prior Publication Data

US 2013/0058064 A1     Mar. 7, 2013

(30) Foreign Application Priority Data

Sep. 5, 2011   (TW) .............................. 100131947 A (51) Int. Cl.
    *H05K 7/16*       (2006.01)
(52) U.S. Cl.
    USPC .................... 361/679.27; 361/755; 455/575.3
(58) Field of Classification Search
    USPC .......... 361/647, 679.26–679.28, 807, 679.09, 361/755; 455/575.1, 575.3, 575.4
    See application file for complete search history.

(56) References Cited

U.S. PATENT DOCUMENTS

| 7,801,576 B2 * | 9/2010 | Fagrenius et al. .......... 455/575.1 |
| 2006/0232912 A1 | 10/2006 | Lin et al. |
| 2009/0154087 A1 * | 6/2009 | Goto ........................ 361/679.27 |

FOREIGN PATENT DOCUMENTS

| JP | 2004/312143 | * 11/2004 |
| TW | M316424 | 8/2007 |

* cited by examiner

*Primary Examiner* — Dameon Levi
*Assistant Examiner* — Thuykhanh Le
(74) *Attorney, Agent, or Firm* — Muncy, Geissler, Olds & Lowe, PLLC (57) ABSTRACT

An electronic device with a cleaning mechanism that is capable of cleaning a display panel thereof is provided. The electronic device includes a display panel, a main portion, a hinge structure, a sliding device, and a first spring. The hinge structure includes a fixing portion, a rotating portion having a first contact surface, and a spring holder having a second contact surface. When the rotating portion rotates on the fixing portion, the first contact surface contacts the second contact surface and presses against the spring holder so that it rotates with the rotating portion. The sliding device includes a cleaning material contacting the display panel. Two end portions of the first spring are respectively fixed to the spring holder and the sliding device. When the spring holder stretches the first spring to move the sliding device, the cleaning material cleans the display panel.

10 Claims, 7 Drawing Sheets

ELECTRONIC DEVICE WITH CLEANING MECHANISM CAPABLE OF CLEANING DISPLAY PANEL THEREOF

RELATED APPLICATIONS

This application claims priority to Taiwan Application Serial Number 100131947, filed Sep. 5, 2011, which is herein incorporated by reference.

BACKGROUND

1. Technical Field

The present disclosure relates to an electronic device with a cleaning mechanism that is capable of cleaning a display panel of the electronic device.

2. Description of Related Art

In recent years, various technically advanced consumer electronics products have been developed. Some consumer electronics products have become indispensable for people in modern society. Mobile phones, handheld computers, and notebooks are examples of such indispensable consumer electronics products. Through the aforementioned portable electronic devices, people may communicate information via networks, watch videos, and listen to music anytime and anywhere.

However, after using an electronic device having a display panel, dust or an oily residue may accumulate on the display panel. If the display panel is not cleaned immediately, as time goes by, dust and oil accumulates even more easily on the display panel, such that the dust and oil become more difficult to clean. Moreover, dust and oil on the display panel may affect the display quality of the display panel. Whenever users open an upper housing of a notebook computer to use the same, dust may attach to the display panel of the notebook computer, and the amount of dust that attaches to the display panel may depend on location and time. For example, if the notebook computer is used outside (e.g., in a park), a significant amount of dust may attach to the display panel.

Users usually do not carry a cleaning cloth for the display panel when using a notebook computer outside. When dust or oil on the display panel blurs displayed images, users may simply use their fingers or facial tissues to clean the display panel. This may result in fingerprints being left on the display panel or scratching of the display panel by the facial tissues.

SUMMARY

An aspect of the present invention is to provide an electronic device with a cleaning mechanism capable of cleaning a display panel of the electronic device.

In an embodiment of the present invention, an electronic device with a cleaning mechanism capable of cleaning a display panel of the electronic device includes a display panel, a main portion, a hinge structure, a sliding device, and a first spring. The hinge structure includes a fixing portion, a rotating portion, and a spring holder. The fixing portion is fixed in the main portion. The rotating portion pivots on the fixing portion and is fixed to a side of the display panel. The rotating portion includes a first contact surface. The spring holder is rotatably located between the fixing portion and the rotating portion. The spring holder includes a second contact surface. When the rotating portion rotates on the fixing portion, the first contact surface contacts the second contact surface and presses against the spring holder so that the spring holder rotates with the rotating portion. The sliding device is located on the display panel and includes a cleaning material contacting the display panel. Two end portions of the first spring are respectively fixed to the spring holder and the sliding device. When the spring holder stretches the first spring, the first spring moves the sliding device in a first direction and the cleaning material cleans the display panel.

In an embodiment of the present invention, the sliding device comprises a bottom plate and a sliding element. The bottom plate is disposed on the rear surface of the display panel. Two sides of the bottom plate respectively comprise a sliding rail. The sliding element is coupled to the sliding rails. The first spring pulls the sliding element to move on the bottom plate.

In an embodiment of the present invention, the sliding element comprises a frame portion for accommodating the display panel. The cleaning material is disposed on a side of the frame portion adjacent to the display panel.

In an embodiment of the present invention, the sliding element comprises a positioning groove, and the sliding device further comprises a second spring, a connecting arm, and a torsion spring for moving the sliding element on the bottom plate. An end portion of the second spring is fixed in the positioning groove. Two end portions of the connecting arm are respectively fixed to the bottom plate and another end portion of the second spring. Two end portions of the torsion spring are respectively fixed to the bottom plate and the sliding element.

In an embodiment of the present invention, the electronic device further comprises a third spring for moving the sliding element in a second direction on the display panel. Two end portions of the third spring are respectively fixed to the bottom plate and the sliding element.

In an embodiment of the present invention, the second direction is opposite to the first direction.

In an embodiment of the present invention, the fixing portion comprises a stop wall for limiting the rotating range of the spring holder and the rotation portion.

In an embodiment of the present invention, the electronic device further comprises a screw for penetrating through the rotation portion and engaging with the display panel.

In an embodiment of the present invention, the electronic device further comprises an upper housing for accommodating the display panel, the rotation portion, and the sliding device.

In an embodiment of the present invention, the cleaning material comprises fibers.

In the aforementioned embodiments of the present invention, when the upper housing and the main portion of the electronic device are opened, the rotating portion rotates on the fixing portion and presses against the spring holder so that the spring holder rotates with the rotating portion, such that the spring holder stretches the first spring and the first spring moves the sliding device located on the display panel in a first direction (i.e., toward the hinge structure). Therefore, the cleaning material located on the frame portion may clean the display panel with the movement of the sliding element. Furthermore, the sliding device further includes a second spring, a connecting arm, and a torsion spring. These elements may increase the moving distance of the sliding element coupled to the sliding rails. Moreover, the electronic device may optionally include a third spring. When the upper housing and the main portion of the electronic device are closed, the third spring may move the sliding element of the sliding device located on the display panel in a second direction (i.e., away from the hinge structure).

With such a design, when the upper housing and the main portion of the electronic device are opened or closed, the cleaning material may clean the display panel with the movement of the sliding element, such that dust or oil does not attach to the display panel. When users go outside to use the electronic device, users do not need to carry a cleaning cloth for the display panel and therefore do not need to use their fingers or facial tissues to clean the display panel. Therefore, with the use of the electronic device, scratching of the display panel as a result of using facial tissues thereon and the accumulation of fingerprints on the display panel through use of fingers to wipe away dust or oil may be avoided.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
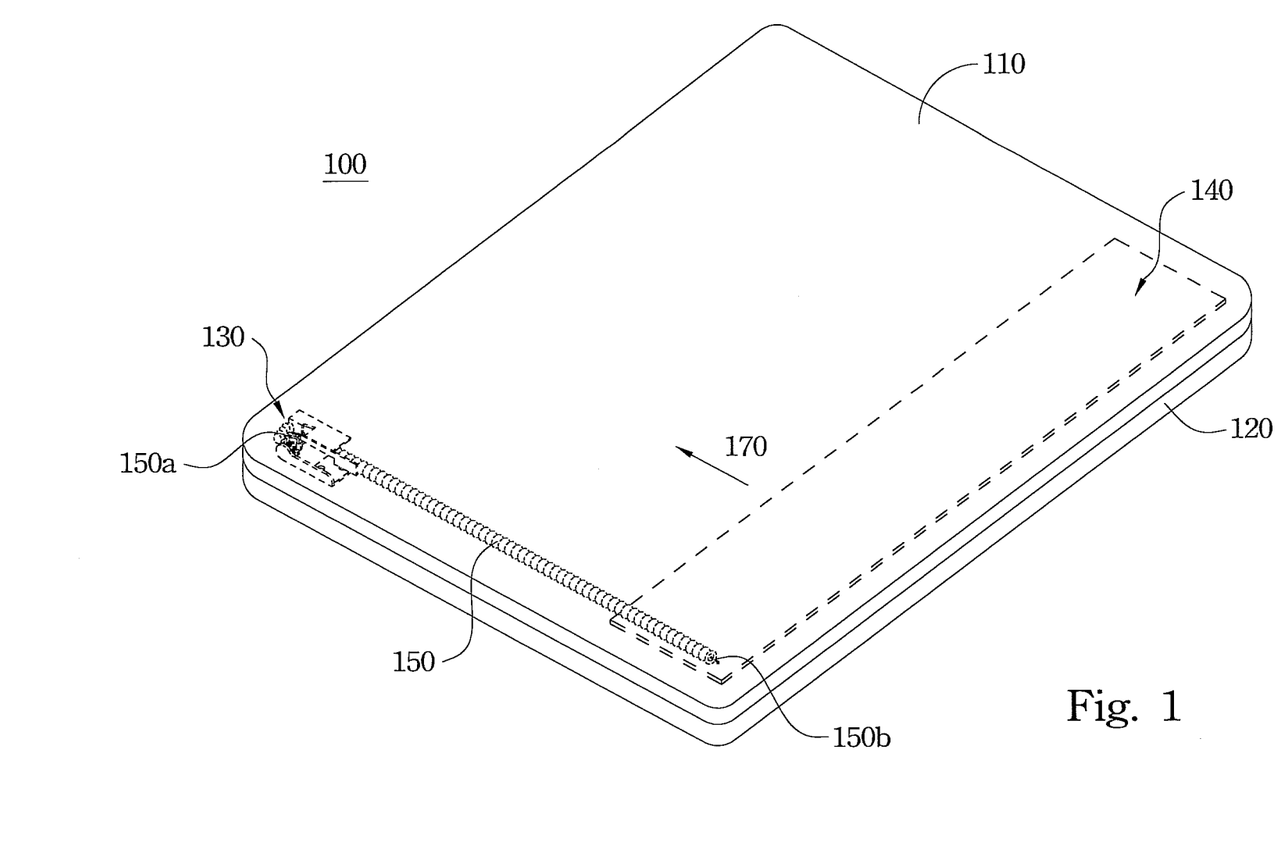
FIG. 1 is a perspective view of an electronic device with a cleaning mechanism that is capable of cleaning a display panel of the electronic device according to an embodiment of the present invention, in which the electronic device is shown in a state when an upper housing and a main portion thereof are closed.
Figure 2:
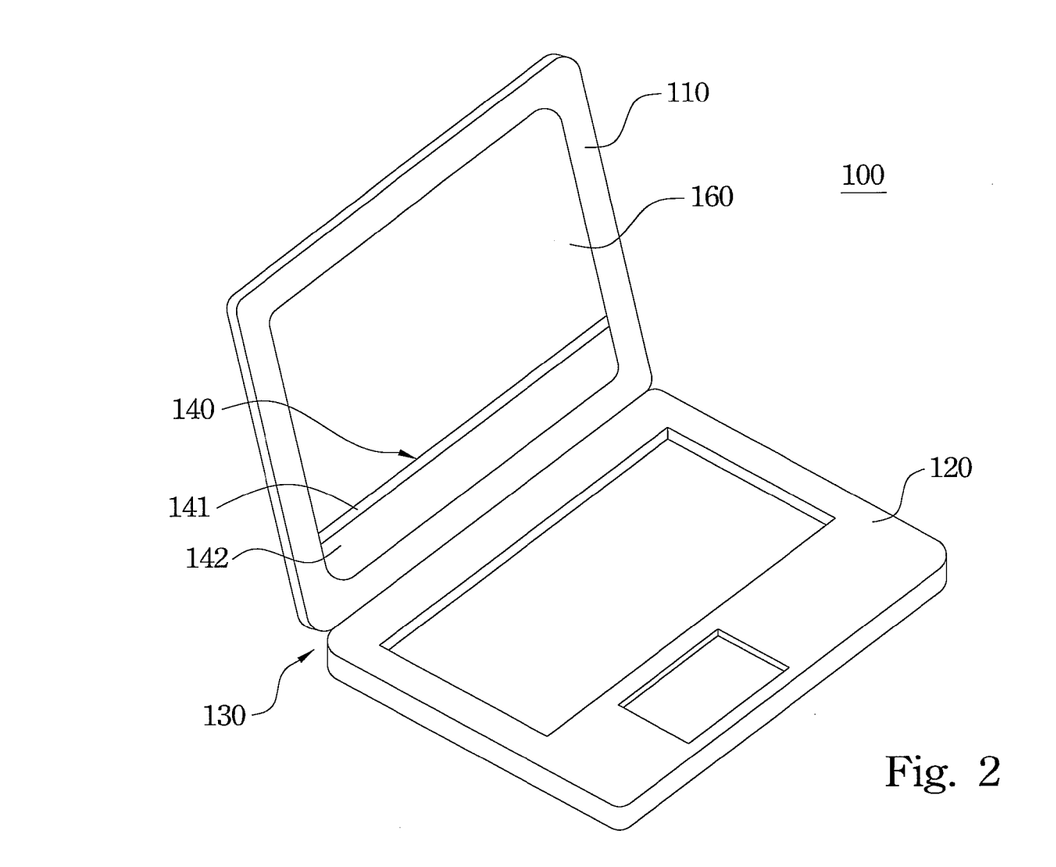
FIG. 2 is a perspective view of the electronic device shown in FIG. 1 when the upper housing and the main portion thereof are opened.

FIG. 1 is a perspective view of an electronic device 100 with a cleaning mechanism that is capable of cleaning a display panel 160 of the electronic device 100 according to an embodiment of the present invention, in which the electronic device 100 is shown in a state when an upper housing 110 and a main portion 120 thereof are closed. FIG. 2 is a perspective view of the electronic device 100 shown in FIG. 1 when the upper housing 110 and the main portion 120 thereof are opened.

As shown in FIG. 1 and FIG. 2, the electronic device 100 includes the display panel 160, the upper housing 110, the main portion 120, a hinge structure 130, a sliding device 140, and a first spring 150. An end portion 150a of the first spring 150 is fixed to the hinge structure 130, and another end portion 150b of the first spring 150 is fixed to the sliding device 140. The sliding device 140 is located on the display panel 160. A cleaning material 142 is located on a frame portion 141 of the sliding device 140 and contacts the display panel 160.

In use, when the upper housing 110 is opened, the hinge structure 130 stretches the first spring 150, then the first spring 150 moves the sliding device 140 located on the display panel 160 in a first direction 170, such that the cleaning material 142 cleans the display panel 160. The first direction 170 is a direction toward the hinge structure 130.

The following description provides more details about the connecting relationships among and the aforementioned elements.

Figure 3:
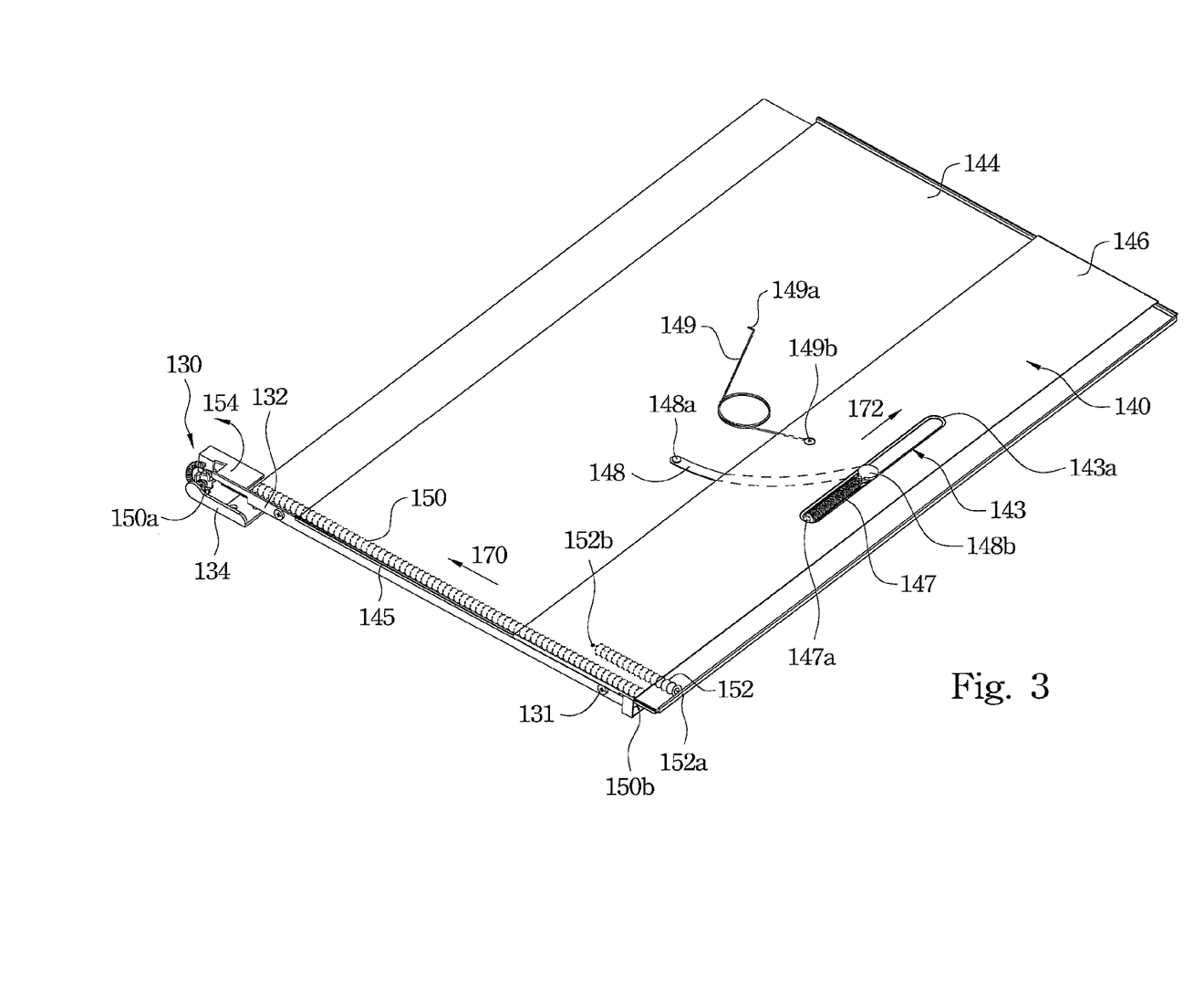
FIG. 3 is a perspective view of the electronic device shown in FIG. 1 when the upper housing and the main portion thereof are removed.
Figure 4:
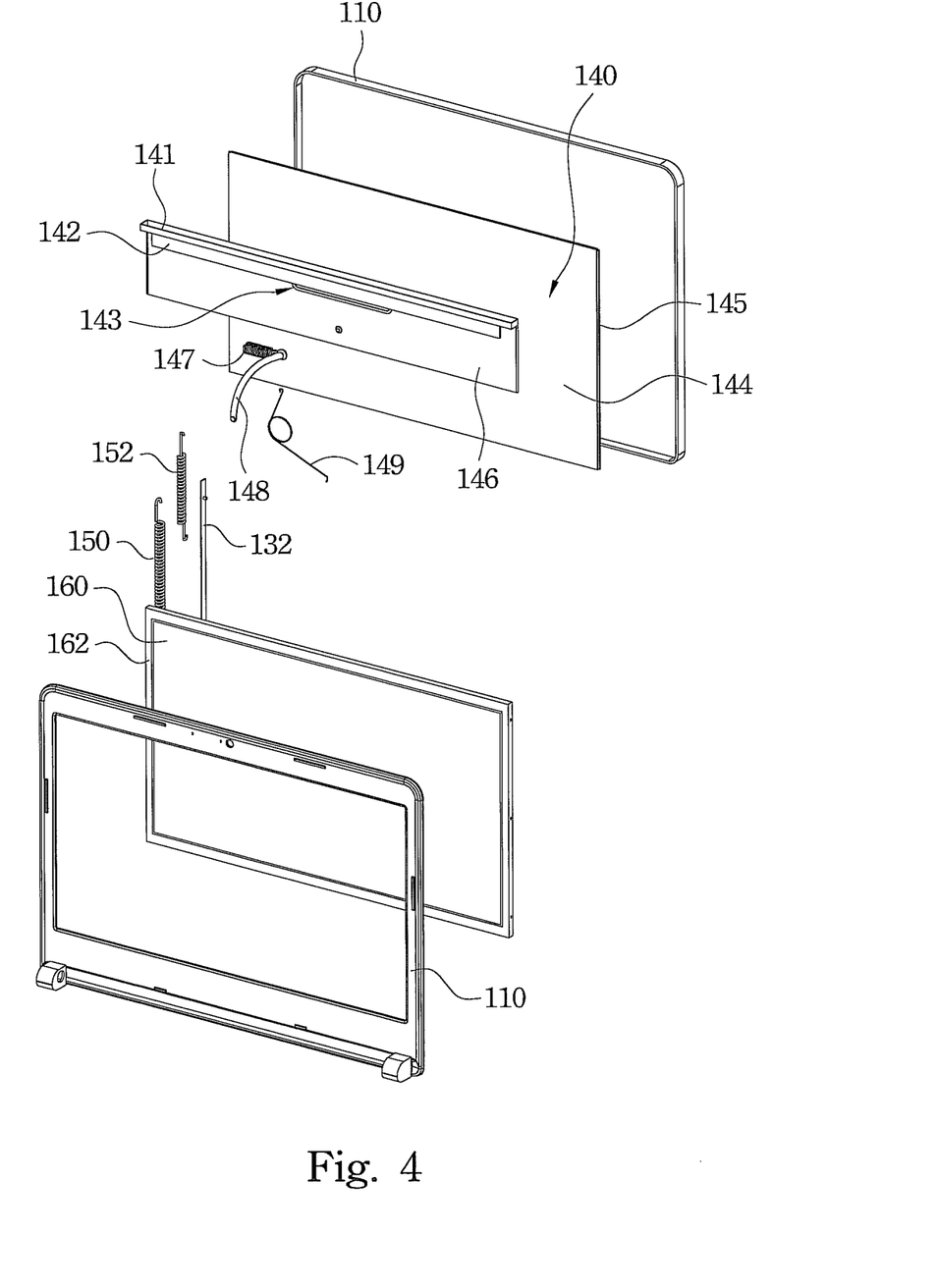
FIG. 4 is an exploded view of the upper housing shown in FIG. 1.

FIG. 3 is a perspective view of the electronic device 100 shown in FIG. 1 when the upper housing 110 and the main portion 120 thereof are removed. FIG. 4 is an exploded view of the upper housing 110 shown in FIG. 1. As shown in FIG. 3 and FIG. 4, the sliding device 140 includes a bottom plate 144 and a sliding element 146. The bottom plate 144 is located on the rear surface of the display panel 160. Each of two sides of the bottom plate 144 includes a sliding rail 145. The sliding element 146 is coupled to the sliding rails 145. Moreover, the sliding element 146 includes the frame portion 141 to accommodate the display panel 160. The cleaning material 142 is located on a side of the frame portion 141 adjacent to the display panel 160. The cleaning material 142 may include fibers, such as those included in a cleaning cloth or a cleaning brush used for a display panel.

In this embodiment, in order to increase the moving distance of the sliding element 146 coupled to the sliding rails 145, the sliding element 146 includes a positioning groove 143, and the sliding device 140 may further include a second spring 147, a connecting arm 148, and a torsion spring 149 for moving the sliding element 146 on the bottom plate 144. An end portion 147a of the second spring 147 is fixed in the positioning groove 143. An end portion 148a of the connecting arm 148 is fixed to the bottom plate 144. Another end portion 148b of the connecting arm 148 is fixed to another end portion of the second spring 147. An end portion 149a of the torsion spring 149 is fixed to the bottom plate 144, and another end portion 149b of the torsion spring 149 is fixed to the sliding element 146.

In another aspect, the electronic device 100 may optionally include a third spring 152. An end portion 152a of the third spring 152 is fixed to the bottom plate 144, and another end portion 152b of the third spring 152 is fixed to the sliding element 146. When the upper housing 110 and the main portion 120 (shown in FIG. 1) are gradually changed from an open state to a closed state, the first spring 150 and the second spring 147 operate at the same time, such that the third spring 152 may move the sliding element 146 of the sliding device 140 located on the display panel 160 in a direction opposite to the first direction 170 (i.e., away from the hinge structure 130) by the recovery elastic force of the stretched third spring 152.

The hinge structure 130 includes a fixing portion 134 and a rotating portion 132. The fixing portion 134 is fixed in the main portion 120 (shown in FIG. 1). The rotating portion 132 pivots on the fixing portion 134 and is fixed to a side of the display panel 160. In this embodiment, a screw 131 penetrates through the rotation portion 132 and engages with a protection frame 162 of the display panel 160. Furthermore, the display panel 160, the rotation portion 132, and the sliding device 140 are accommodated in the upper housing 110.

Figure 5:
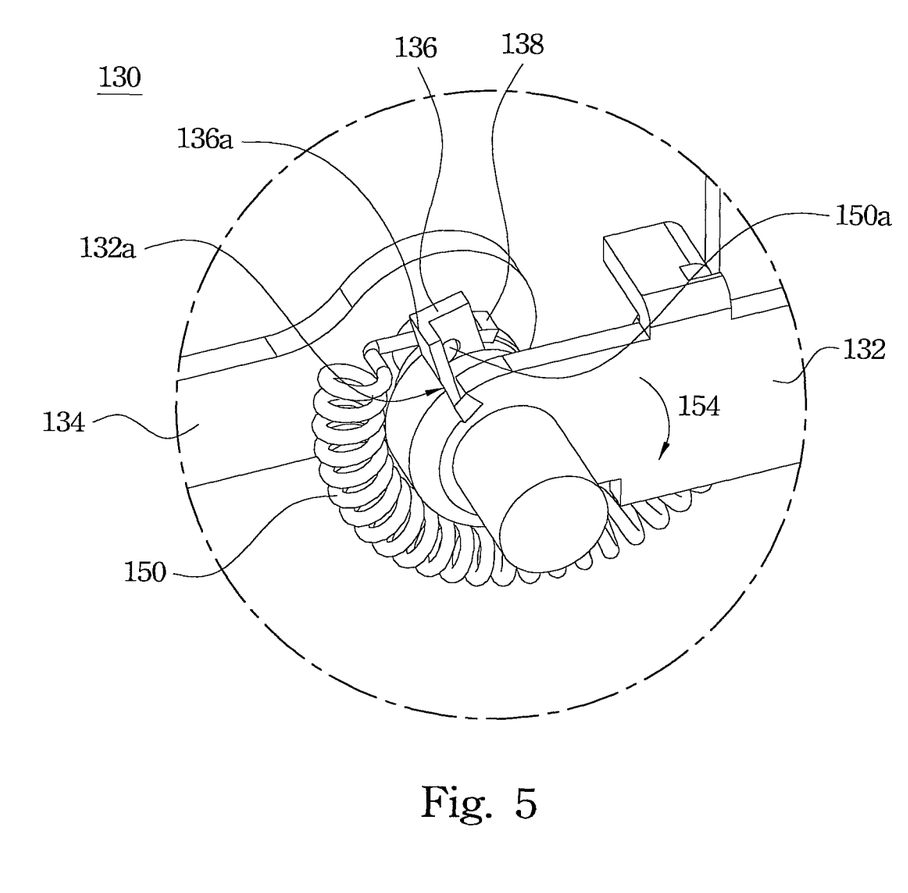
FIG. 5 is a partial perspective view of a hinge structure shown in FIG. 3 when being opened.

FIG. 5 is a partial perspective view of the hinge structure 130 shown in FIG. 3 when being opened. As shown in FIG. 3 and FIG. 5, the rotating portion 132 includes a first contact surface 132a. A spring holder 136 is rotatably located between the fixing portion 134 and the rotating portion 132, and the spring holder 136 includes a second contact surface 136a. When the rotating portion 132 rotates on the fixing portion 134, the first contact surface 132a contacts the second contact surface 136a and presses against the spring holder 136 so that the spring holder 136 rotates with the rotating portion 132. An end portion 150a of the first spring 150 is fixed to the spring holder 136. Moreover, the fixing portion 134 may further include a stop wall 138 to limit the rotating range of the spring holder 136 and the rotation portion 132.

Much of the information described above will not be repeated in the following description, and only aspects related to the sliding device 140 will be described.

Figure 6:
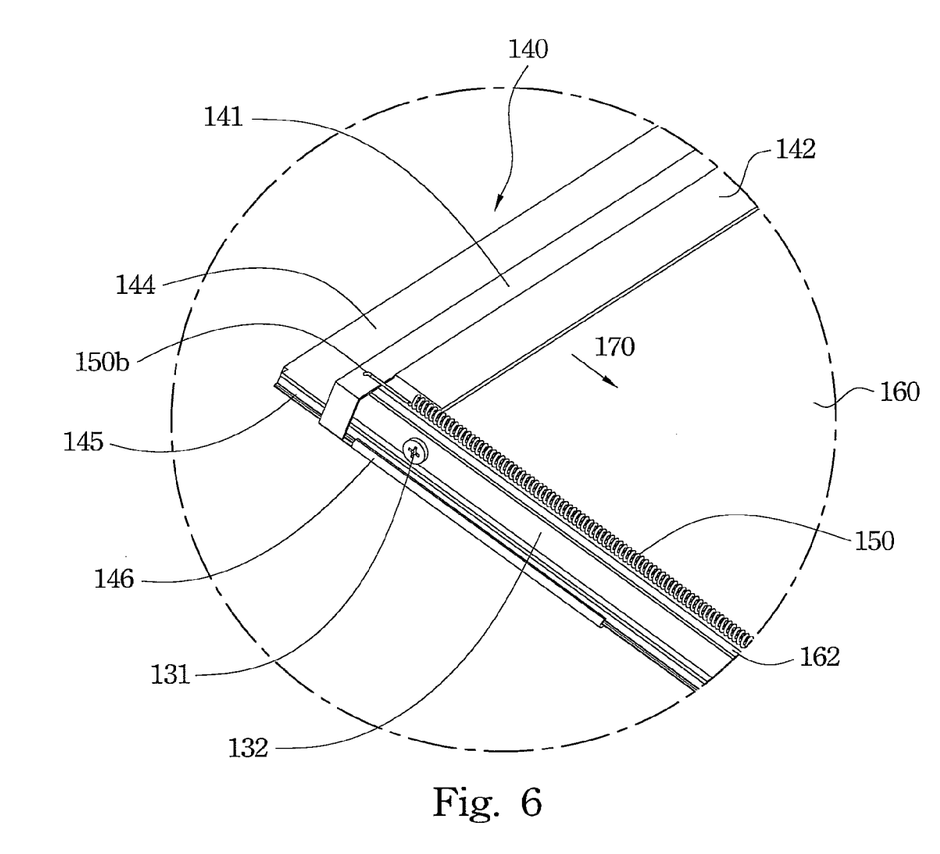
FIG. 6 is a partial perspective view of a sliding device shown in FIG. 3.

FIG. 6 is a partial perspective view of the sliding device 140 shown in FIG. 3. As shown in FIG. 3 and FIG. 6, when the rotation portion 132 rotates in a direction 154 (resulting from opening the upper housing 110 and the main portion 120 shown in FIG. 1), because the spring holder 136 (shown in FIG. 5) stretches the first spring 150, the first spring 150 may pull the sliding element 146 of the sliding device 140 to move on the bottom plate 144 and move on the display panel 160 in the first direction 170. Therefore, the cleaning material 142 located on the frame portion 141 of the sliding element 146 may clean the display panel 160 while moving in the first direction 170.

Furthermore, the sliding element 146 may be pulled in the first direction 170 by the first spring 150, and the sliding element 146 may keep moving from the upper end of the display panel 160 (i.e., the end away from the hinge structure 130) to the lower end of the display panel 160 (i.e., the side adjacent to the hinge structure 130) by cooperation among the positioning groove 143, the second spring 147, the connecting arm 148, and the torsion spring 149. In another aspect, when the sliding element 146 moves in the direction 170, the end portion 148b of the connecting arm 148 may move to an end portion 143a of the positioning groove 143 in a direction 172 along the positioning groove 143.

Figure 7:
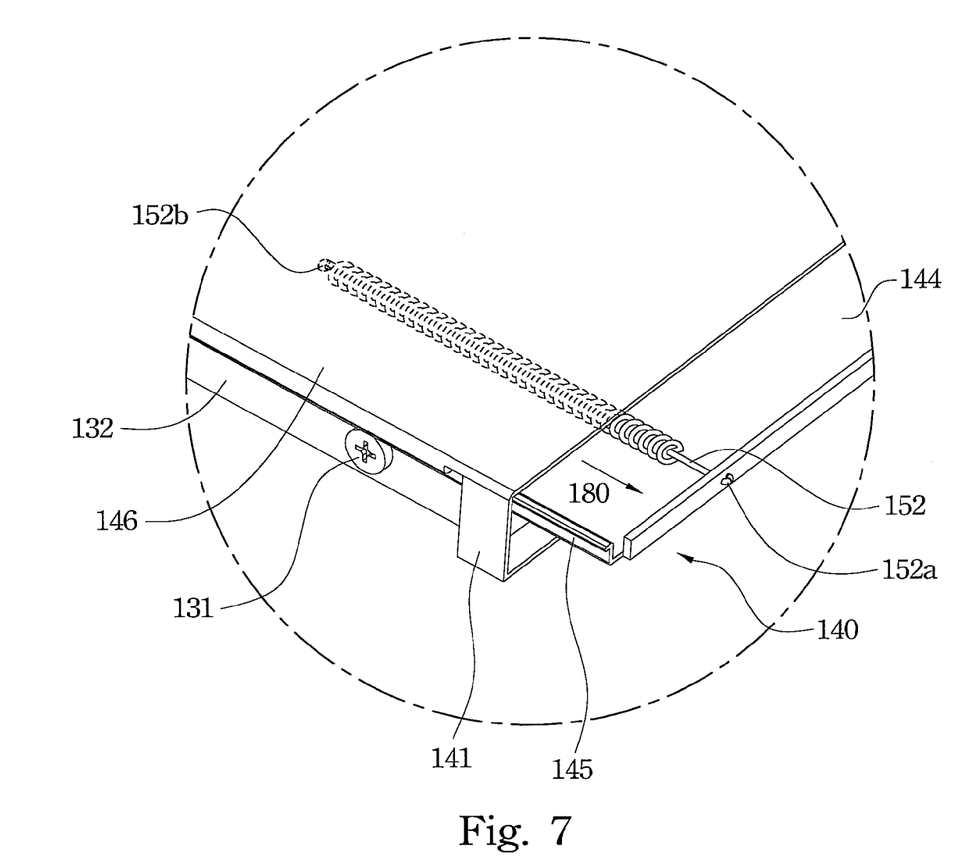
FIG. 7 is another partial perspective view of the sliding device shown in FIG. 3.

FIG. 7 is another partial perspective view of the sliding device 140 shown in FIG. 3. As shown in FIG. 2 and FIG. 7, when the upper housing 110 and the main portion 120 are changed from an open state to a closed state, the third spring 152 may move the sliding element 146 of the sliding device 140 located on the display panel 160 in a second direction 180. The second direction 180 is opposite to the first direction 170 (as shown in FIG. 3), and the second direction 180 is a direction away from the hinge structure 130. Thus, the cleaning material 142 located on the frame portion 141 of the sliding element 146 may clean the display panel 160 while moving in the second direction 180.

Similarly, the sliding element 146 may be pulled in the second direction 180 by the third spring 152, and the sliding element 146 may keep moving from the lower end of the display panel 160 (i.e., the end adjacent to the hinge structure 130) to the upper end of the display panel 160 (i.e., the end away from the hinge structure 130) by cooperation among the positioning groove 143, the second spring 147, the connecting arm 148, and the torsion spring 149 shown in FIG. 3.

Therefore, regardless of whether the upper housing 110 and the main portion 120 are opened or closed, the cleaning material 142 may clean the display panel 160 with the movement of the frame portion 141 of the sliding element 146 of the sliding device 140. Through such a design and operation, dust or oil is removed from the display panel 160, and users can always be presented with the display panel 160 in a clean state.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An electronic device with a cleaning mechanism that is capable of cleaning a display panel thereof, the electronic device comprising:
    a display panel;
    a main portion;
    a hinge structure, comprising;
        a fixing portion fixed in the main portion;
        a rotation portion pivoting on the fixing portion and fixed to a side of the display panel, wherein the rotation portion comprises a first contact surface; and
        a spring holder rotatably disposed between the fixing portion and the rotation portion, the spring holder comprising a second contact surface, wherein when the rotation portion rotates on the fixing portion, the first contact surface contacts the second contact surface and presses against the spring holder so that the spring holder rotates with the rotating portion;
    a sliding device disposed on the display panel, wherein the sliding device comprises a cleaning material contacting the display panel; and
    a first spring having two end portions, wherein the two end portions of the first spring are respectively fixed to the spring holder and the sliding device, when the spring holder stretches the first spring, the first spring moves the sliding device in a first direction and the cleaning material cleans the display panel.

2. The electronic device as claimed in claim 1, wherein the sliding device comprises:
    a bottom plate disposed on the rear surface of the display panel, wherein two sides of the bottom plate respectively comprise a sliding rail; and
    a sliding element coupled to the sliding rails, wherein the first spring pulls the sliding element to move on the bottom plate.

3. The electronic device as claimed in claim 2, wherein the sliding element comprises:
    a frame portion for accommodating the display panel, wherein the cleaning material is disposed on a side of the frame portion adjacent to the display panel.

4. The electronic device as claimed in claim 2, wherein the sliding element comprises a positioning groove, and the sliding device further comprises:
    a second spring, wherein an end portion of the second spring is fixed in the positioning groove;
    a connecting arm, wherein two end portions of the connecting arm are respectively fixed to the bottom plate and another end portion of the second spring; and
    a torsion spring for moving the sliding element on the bottom plate, wherein two end portions of the torsion spring are respectively fixed to the bottom plate and the sliding element.

5. The electronic device as claimed in claim 2 further comprising:
    a third spring for moving the sliding element in a second direction on the display panel, wherein two end portions of the third spring are respectively fixed to the bottom plate and the sliding element.

6. The electronic device as claimed in claim 5, wherein the second direction is opposite to the first direction.

7. The electronic device as claimed in claim 1, wherein the fixing portion comprises:
    a stop wall for limiting the rotating range of the spring holder and the rotation portion.

8. The electronic device as claimed in claim 1 further comprising:

a screw for penetrating through the rotation portion and engaging with the display panel.

9. The electronic device as claimed in claim 1 further comprising:

an upper housing for accommodating the display panel, the rotation portion, and the sliding device.

10. The electronic device as claimed in claim 1, wherein the cleaning material comprises fibers.

* * * * *